UNITED STATES PATENT OFFICE 2,371,700

ABRASIVE ARTICLES

Harry C. Martin and Frederick A. Upper, Niagara Falls, N. Y., assignors to The Carborundum Company, Niagara Falls, N. Y., a corporation of Delaware No Drawing. Application October 12, 1943, Serial No. 505,945

6 Claims. (Cl. 51—298)

This invention relates to improved abrasive articles containing a resin bond. More specifically, the invention is directed to the production of abrasive articles in which the bond comprises a particular form of metal-modified phenolic resin.

This application is a continuation-in-part of our copending application Serial No. 347,312, filed July 24, 1940.

Abrasive articles have been made with the ordinary phenol formaldehyde condensation products and methods of their manufacture with such resins are well known. For example, the Martin Patent Re. 19,318 describes the production of abrasive wheels or discs using phenol formaldehyde resin and is particularly concerned with the method of making such articles. It has also been customary to include in such articles inert fillers such as pulverized flint, rouge, magnesia or other inorganic material.

Our invention follows from the discovery that certain particular forms of phenol aldehyde resins are especially well adapted for the manufacture of abrasive wheels and discs, as well as coated abrasives of the class commonly referred to as sandpaper.

The particular feature of the invention is the inclusion within a phenol aldehyde condensation product of a metal or a compound of a metal. The metal is either reacted into the resin molecule or is colloidally dispersed in such a finely-divided state as to be indistinguishable at magnifications as high as several hundred times. The metals which we have found to be particularly well suited for use in the invention include those having atomic numbers from 22 to 28. These elements occur in the fourth series of the Mendeleeff period arrangement of the elements in groups IV to VIII, both inclusive. Within this broader group it has been found that those having atomic numbers from 24 to 28 are somewhat better than the others of the broader group and specifically, we have found that resins containing chromium, iron or nickel, which have atomic numbers of 24, 26 and 28 respectively, are outstanding.

The metals may be incorporated into the resin in any of a number of ways, either as the metals themselves or as a compound thereof. One method we have found to be quite satisfactory is to distribute the metal or metal compound through the liquid reaction product of a phenol and formaldehyde and continue the reaction until the liquid material has reached the normally solid condition where it is still fusible and soluble in ordinary solvents or the so-called solid "A" stage. Alternatively, we may introduce the metal or metal compound into the reaction chamber with the phenol and aldehyde which are employed as the reaction materials. We have found that the resins which contain the metal material in the condition of our invention make abrasive articles having properties which are decidedly superior, for certain purposes, to those made by employing an ordinary phenol aldehyde resin in which a metallic filler is merely ground up with the solid resin after it has been brought up to the solid "A" condition, or added to the abrasive mix in accordance with the practice of the prior art.

While the invention can be carried out with the conventional phenols such as ordinary phenol or a cresol, we may also employ other less common phenols, such as the polyhydric phenols or phenols containing an acid group, such as salicyclic acid. In such case, it is possible that the metal or metal compound, such as the oxide, reacts into the resin molecule, as by the usual reaction of salt formation where the phenol contains an acid group. Alternatively, a special reaction material may be obtained by reacting ordinary phenol with chloracetic acid in an alkaline solution. Such reaction probaly causes the attachment of the acid group to the phenol and the acid phenol may then be condensed with formaldehyde, preferably in the presence of an acid catalyst.

The resins of our invention are usually colored from the inclusion of the metal and, as stated, the metal is either reacted or is so finely dispersed through the resin body that the resins are translucent and are indistinguishable by visual observation, exception for their color, from the ordinary resins which do not contain metals or metal compounds incorporated in the condition which obtains in the resin of our invention. Although it is not definitely known whether the metal is actually reacted into the resin molecule or whether it is present in finely-divided condition and suspended in a manner similar to a colloidal suspension, in any event the metal constituent is so incorporated in the resinoid as to have lost its physical identity as discrete particles to the extent that it is indistinguishable at magnifications as high as 500 times. By way of comparison it may be said that rouge, which is a commonly used filling material obtainable in very finely divided form, can be readily seen at magnifications of about one tenth this amount.

Following the preparation of the solid "A stage" metal-modified resin, the resin is pulverized to a fine condition in the customary manner well known in the art.

The proportion of metal or metal compound which is added may vary over a considerable range. It may be as high as 20% of the organic portion of the resin. Generally speaking, we prefer to use resins having from 3% to 15%, and particularly resins containing approximately 7%, of the metal or metal compound, calculated as the higher oxide, i. e. as $Fe_2O_3$, $Cr_2O_3$, etc.

Having prepared the metal-modified resin, we make up abrasive articles by the usual methods. In the manufacture of so-called bonded articles, such as abrasive wheels and stones, we may employ any of the well-known methods but we prefer to use that described and claimed in the Martin Reissue Patent No. 19,318. In making coated abrasives, we dissolve the metal-modified resin in a suitable solvent, such as a liquid resin, and apply the liquid material to the backing in the conventional manner. Following the application of the liquid adhesive abrasive grains are applied, using an excess of the amount which will adhere, the excess grain is removed and the liquid is caused to solidify by evaporation of the solvent or by heat treatment to advance the liquid resin where such is used. It is also customary to apply a second or so-called sizing coat over the abrasive grains, after which the articles are heated to advance the resin to the final infusible, insoluble or so-called "C" stage in which condition synthetic resins are commonly called "resinoids."

We will now illustrate the invention by a specific example, it being understood that the example is illustrative only and not limitative.

A so-called "cut off wheel" having an outer diameter of 12", an arbor hole of 1" in diameter and a thickness of $\frac{3}{32}$" was prepared from the following mixture:

| | Per cent |
|---|---|
| 50 grit fused alumina abrasive grain | 85 |
| Metal modified resin "Bakelite XR-10015" | 15 |

The manufacture of the metal-modified resin "Bakelite XR-10015" is described in British patent specification No. 556,126.

The abrasive mix was made by first wetting the grains with furfural in the proportion of 27 cc. per 1000 gms. of the mix and then adding the pulverized resin and stirring to distribute the resin over the grains. This made a mix in which the resin was all attached to the abrasive grains but which was dry to the touch because of the coating of resin about the grains. A suitable amount of the mixture was placed in a mold and pressed at 3000#/in.$^2$ to form the wheel, which was then removed and cured by raising the temperature over a period of 16 hours up to 350° F. and holding at this temperature for 9 hours.

A wheel made in accordance with this example was found to be approximately one-third more efficient than a similar wheel made with the conventional phenol aldehyde resin heretofore used. For example, the wheel was used for cutting off 1" cold rolled steel and it was found that after 25 cuts with the wheel of the example the wheel had decreased in diameter only 0.84" whereas a wheel made identical thereto except that a conventional phenol aldehyde resin not containing metal was employed, was reduced in diameter by 1.41" after 25 cuts on the same material under the same standard testing conditions. For purposes of comparison, a third wheel was made in which chromium oxide was mixed with the powdered conventional resin according to the practice of the prior art, the composition of the abrasive mix and the method employed in making the wheel being otherwise identical with the other two wheels. Under the same standard test conditions which were used in testing the other two wheels, that wheel was reduced in diameter by 1.44". Similar results were obtained where other fillers, including rouge, magnesia and zinc oxide, were substituted for the chromium oxide and in no case were wheels obtained in which the wheel diameter, under the standard test conditions, were reduced by less than 1.25".

It has been found that abrasives made in accordance with our invention not only have an improved cutting efficiency, as illustrated above, but that it is also possible to compress them more highly and thus provide more dense structures without causing bloating. If abrasive articles made with the ordinary phenol resin bonds are pressed too highly or are made with too much of the resin bond, the resin cannot be cured to a solid dense structure but bloats during the curing operation. Articles in which the bond has bloated are practically useless because the bond does not have the required strength and the articles are not uniform and in balance.

The articles of our invention are also much more resistant to water than are abrasive articles bonded with the conventional resins. Considerable difficulty is experienced with the finer grit abrasive wheels bonded with the ordinary phenolic resins where the wheels are used for wet grinding. While phenol resins are commonly thought of as being highly water resistant, the amount of surface exposed in grinding wheels is so great that it is commonly found that fine grit wheels become decidedly softer in use when water is applied and their efficiency is correspondingly reduced. Abrasive wheels or stones made according to our invention do not show this softening when used wet.

The usual modifications employed in the abrasive art may be used in carrying out our invention as, for example, the inclusion of inert fillers, such as pulverized flint. Likewise, the abrasive mixes may be made with other plasticizers than the furfural shown in this specific example, such as the ordinary liquid resins. We may also employ two or more of the metals in the same resin as, for example, by making a resin containing both chromium and iron. We have also found that certain improvements in the methods of manufacturing resin bonded abrasives, such as those shown in the Martin and Upper Patents No. 2,010,873 and No. 2,114,229, may be used in carrying out our invention.

Where the term "metal-modified resin" is employed in the claims, it is to be understood that we mean to include either the metal itself or the compound, as described. Likewise, since it is uncertain whether or not the metal or metal compound is actually reacted into the resin molecule in some of the methods of preparation which we have described, it is to be understood that this term "metal-modified resin" is to be interpreted to include both resins in which the metal or metal compound is wholly or in part reacted into the resin molecule and resins in which the metal material are merely mechanically distributed as a physical mixture through the mass of the resin in the finely-divided condition where they are invisible at magnifications of 400 times. Such material is to be distinguished from resins in which powdered metals or compounds are merely added to a solid pulverized resin or to an abrasive mix as a filler according to the practice of the prior art.

While we have described our invention with reference to a specific example and have set forth a number of methods of preparing the resin and forming the abrasive articles, it is to be understood that the invention is not to be limited to the specific materials and methods herein described but rather is to be interpreted as having the scope of the appended claims.

We claim:

1. An abrasive article comprising abrasive grains and a bond therefor comprising a phenol resinoid modified by a metal selected from the group consisting of titanium, vanadium, chromium, manganese, iron, cobalt, and nickel, said metal constituent being so finely divided and incorporated into the resinoid bond as to have lost its physical identity as discrete particles to the extent that it is invisible at magnifications of 500 times.

2. An abrasive article comprising abrasive grains and a bond therefor comprising a metal-modified phenol resinoid in which the metal is chromium, said chromium constituent being so finely divided and incorporated into the resinoid bond as to have lost its physical identity as discrete particles to the extent that it is invisible at magnifications of 500 times.

3. An abrasive article comprising abrasive grains and a bond therefor comprising a metal-modified phenol resinoid in which the metal is iron, said iron constituent being so finely divided and incorporated into the resinoid bond as to have lost its physical identity as discrete particles to the extent that it is invisible at magnifications of 500 times.

4. An abrasive article comprising abrasive grains and a bond therefor comprising a metal-modified phenol resinoid in which the metal is nickel, said nickel constituent being so finely divided and incorporated into the resinoid bond as to have lost its physical identity as discrete particles to the extent that it is invisible at magnifications of 500 times.

5. An abrasive article comprising abrasive grains and a bond therefor comprising a phenol resinoid modified by a metal selected from the group consisting of titanium, vanadium, chromium, manganese, iron, cobalt, and nickel, said metal constituent being so finely divided and incorporated into the resinoid bond as to have lost its physical identity as discrete particles to the extent that it is invisible at magnifications of 500 times and constituting from 3 to 15% of the resinoid, calculated as the higher oxide.

6. An abrasive article comprising abrasive grains and a bond therefor comprising a phenol resinoid modified by a metal selected from the group consisting of titanium, vanadium, chromium, manganese, iron, cobalt, and nickel, said metal constituent being so finely divided and incorporated into the resinoid bond as to have lost its physical identity as discrete particles to the extent that it is invisible magnifications of 500 times and constituting approximately 7% of the resinoid, calculated as the higher oxide.

HARRY C. MARTIN.
FREDERICK A. UPPER.